United States Patent
Ali et al.

(10) Patent No.: US 9,568,189 B2
(45) Date of Patent: Feb. 14, 2017

(54) THERMAL GASIFICATION REACTOR FOR PRODUCING HEAT ENERGY FROM WASTE

(75) Inventors: Mazlan Ali, Taman Setiawangsa (MY); Siti Fatimah Mohd Shariff, Taman Setiawangsa (MY); Christopher John Webb, Newbury (GB)

(73) Assignee: GREEN ENERGY AND TECHNOLOGY SDN BHD, Kuala Lumpur (MY)

(*) Notice: Subject to any disclaimer, the term of this patent is extended or adjusted under 35 U.S.C. 154(b) by 757 days.

(21) Appl. No.: 13/384,573

(22) PCT Filed: May 19, 2010

(86) PCT No.: PCT/MY2010/000082
§ 371 (c)(1),
(2), (4) Date: Jan. 18, 2012

(87) PCT Pub. No.: WO2011/008069
PCT Pub. Date: Jan. 20, 2011

(65) Prior Publication Data
US 2012/0121477 A1     May 17, 2012

(30) Foreign Application Priority Data
Jul. 17, 2009 (MY) .............. PI 20093009

(51) Int. Cl.
*B01J 7/00* (2006.01)
*F23G 5/027* (2006.01)
(Continued)

(52) U.S. Cl.
CPC .............. *F23G 5/027* (2013.01); *C10J 3/08* (2013.01); *C10J 3/20* (2013.01); *F01D 13/00* (2013.01); *F01D 15/10* (2013.01); *F23G 5/0276* (2013.01); *F23G 5/033* (2013.01); *F23G 5/04* (2013.01); *F23G 5/085* (2013.01); *F23G 5/46* (2013.01);
(Continued)

(58) Field of Classification Search
CPC .................. C10J 2300/0943; C10J 2300/0946; F23G 2203/403; F23G 2202/104
See application file for complete search history.

(56) References Cited

U.S. PATENT DOCUMENTS 3,971,637 A * 7/1976 Matthews .................. C10J 3/36
                                                    252/373
4,925,532 A   5/1990 Meuser et al.
(Continued)

FOREIGN PATENT DOCUMENTS

WO    2004/044492 A1    5/2004
WO    2008/104088 A1    9/2008

*Primary Examiner* — Imran Akram
(74) *Attorney, Agent, or Firm* — Maschoff Brennan

(57) ABSTRACT

A thermal reactor for producing usable heat energy by destroying waste including a vessel wherein organic waste upon entering said vessel gasifies as it falls onto a carbon bed and is transformed into a synthesis gas with high heat and kinetic energy that can be harnessed to produce electricity. Inorganic waste upon entering melts as it falls onto the carbon bed and exits via slag ports to form an inert slag. Because there is no oxygen present in the gasification zone, the waste is not combusted and neither furan or dioxin are formed. The waste includes either prepared refuse derived fuel (RDF) or unprepared raw waste or a combination thereof.

18 Claims, 2 Drawing Sheets

(51) Int. Cl.

| | |
|---|---|
| *F23G 5/08* | (2006.01) |
| *F23G 5/46* | (2006.01) |
| *F23G 7/00* | (2006.01) |
| *F23G 7/12* | (2006.01) |
| *C10J 3/08* | (2006.01) |
| *C10J 3/20* | (2006.01) |
| *F01D 13/00* | (2006.01) |
| *F01D 15/10* | (2006.01) |
| *F23G 5/033* | (2006.01) |
| *F23G 5/04* | (2006.01) |
| *F23J 15/02* | (2006.01) |

(52) U.S. Cl.
CPC ............... *F23G 7/003* (2013.01); *F23G 7/12* (2013.01); *F23J 15/02* (2013.01); *C10J 2300/0943* (2013.01); *C10J 2300/0946* (2013.01); *C10J 2300/0996* (2013.01); *C10J 2300/1238* (2013.01); *F23G 2202/20* (2013.01); *F23G 2203/403* (2013.01); *F23G 2206/203* (2013.01); *F23G 2207/30* (2013.01); *F23G 2207/60* (2013.01); *F23G 2209/281* (2013.01); *Y02E 20/12* (2013.01); *Y02E 20/16* (2013.01); *Y02P 20/129* (2015.11)

(56) References Cited

U.S. PATENT DOCUMENTS

| | | |
|---|---|---|
| 5,085,738 A | 2/1992 | Harris et al. |
| 6,987,792 B2 | 1/2006 | Do et al. |
| 2002/0095866 A1* | 7/2002 | Hassett ............... 48/199 FM |
| 2006/0112639 A1* | 6/2006 | Nick et al. ............... 48/198.1 |
| 2008/0216405 A1* | 9/2008 | Ichikawa et al. ............ 48/61 |
| 2009/0064581 A1 | 3/2009 | Nielsen et al. |
| 2009/0307974 A1 | 12/2009 | Dighe et al. |
| 2010/0199556 A1* | 8/2010 | Dighe et al. ................. 48/65 |
| 2010/0263278 A1* | 10/2010 | Kowoll et al. ............... 48/67 |
| 2011/0062013 A1* | 3/2011 | Tsangaris et al. ........ 202/209 |
| 2011/0078951 A1* | 4/2011 | Blasiak et al. ............... 48/63 |
| 2013/0300121 A1* | 11/2013 | Ali et al. ................... 290/52 |

* cited by examiner

THERMAL GASIFICATION REACTOR FOR PRODUCING HEAT ENERGY FROM WASTE

FIELD OF INVENTION

The present invention relates to a thermal reactor for the generation of heat energy and other recyclable by-products by the destruction of organic and inorganic waste.

BACKGROUND OF INVENTION

The need for efficient and environmentally sound methods of waste disposal is ever more urgent. Landfills have been used extensively for waste disposal, since landfill usage typically requires only the collection and transport of the waste to the site. However, landfills require space, and that is something many countries have less and less of, particularly in and adjacent to urban areas, which areas generate the greatest volume of waste material. Landfills, if unsecure, are also not an environmentally friendly solution.

Waste organic materials may decompose and yield harmful products capable of contaminating the soil and ground water. Other organic wastes (such as vehicle tyres and plastic products) exhibit little or no decomposition in a landfill. At present, there are many landfills devoted exclusively to used vehicle tyres, some containing several million tyres each. Any fire in such tyre dumps are extremely difficult to extinguish, and emit huge amounts of pollution. It is therefore desirable to destroy the waste as opposed to merely storing it.

One known method of disposing organic waste is by gasification, which is a process whereby the waste is subjected to high temperature in a low oxygen environment to produce a synthesis gas. U.S. Pat. No. 4,925,532 to Meuser et al. and U.S. Pat. No. 5,085,738 to Harris et al. disclose apparatuses for continuous feed pyrolysis processes having an oxygen free atmosphere over a molten metal bath in which organic solids are thermally converted to hydrocarbon vapors, particulate matter and residual solids. However, both of these processes have been found to have too many operational problems to be commercially viable. The problems include difficulties with the separation and removal of particulate matter and residual solids and, referring particularly to the apparatus in U.S. Pat. No. 5,085,738, difficulties in maintaining an oxygen free atmosphere over the molten metal bath while continually feeding the organic solids therein.

Other known methods have other kinds of drawbacks, such as producing pollutants during the disposal process, not being able to process inorganic waste along with the organic fraction of the waste, or do not produce enough energy even to support the waste disposal process.

What is needed in the art is an apparatus that is able to destroy waste in a safe and controlled environment, generate energy and produce useable fuel and recyclable by-products from the destruction of the waste.

SUMMARY OF INVENTION

The present invention seeks to ameliorate the aforementioned disadvantages by providing an apparatus that is able to destroy waste in a safe and controlled environment.

It is also an objective of the present invention to provide an apparatus that is able to generate energy from the destruction of waste.

It is a further objective of the present invention to provide an apparatus that is able to produce recyclable by-products from the destruction of waste.

The present invention is thus related to a thermal reactor for producing usable heat energy by destroying waste including a vessel wherein organic waste upon entering a gasification zone of the vessel, gasifies as it falls onto a carbon bed and is transformed into a synthesis gas with high heat and kinetic energy that can be harnessed to produce electricity. Inorganic waste upon entering the vessel melts as it falls onto the carbon bed and exits via slag ports to form an inert slag. Because there is no oxygen present in the gasification zone, the waste is not combusted and neither furan or dioxin are formed. The waste includes either prepared refuse derived fuel (RDF) or unprepared raw waste or a combination thereof.

The present invention is also related to a thermal reactor for producing heat energy by destroying waste including an elongated vessel having an internal volume comprising an oxidizing zone located at a lower portion of said internal volume, a carbon bed located above the oxidizing zone, a gasification zone located above the carbon bed, and a syngas retention zone located above the gasification zone. The temperature of the said gasification zone is in excess of 2000° C. Three heat inlet tuyeres are placed equidistant at 120° around a circumference of the vessel and adapted to supply heat into the oxidizing zone. Two directly opposing feed ports deliver organic and inorganic waste into the gasification zone. Two directly opposing coke feed ports deliver carbon into the gasification zone whereby said carbon upon entering the gasification zone moves downwards and creates and maintains a carbon bed between the gasification zone and the oxidizing zone. An exit port is located at an upper end of said vessel being the exit port for the syngas that has slowly risen in the gas retention zone. The temperature and velocity of the gas discharging via the exit port is between 1200-1400° C. and below 2 m/s, respectively. Two directly opposing slag ports are located at a lower end of the vessel for discharge of molten slag. The slag ports, which are purpose designed to prevent solidification, are opened to allow the molten inorganic waste to exit only once the molten inorganic waste reaches a predetermined level in the oxidizing zone.

The organic waste upon entering the gasification zone gasifies as it falls onto the carbon bed and is transformed into a synthesis gas before rising to collect in the gas retention zone. The inorganic waste upon entering the gasification zone melts as it falls onto the carbon bed such that it permeates through the carbon bed and falls into the oxidizing zone to exit via the slag ports. Because there is no oxygen present in the gasification zone, the waste is not combusted. The waste includes either prepared refuse derived fuel (RDF) or unprepared raw waste or a combination thereof.

The reactor breaks down the organic fraction of the waste to its respective molecular levels by way of a no-burn process, and through control of the chemistry at various stages throughout the reactor, will manage the re-formation of chemical bonds to maximise the production of a useable synthesis gas (syngas) while avoiding, or minimising, the formation of unwanted compounds such as $CO_2$, Dioxin and Furan. The inorganic fraction of the waste melts and is transformed to a molten slag which, after exiting the reactor, solidifies to become an inert slag with a 'glass' like appearance having a leaching level in the order 0.005 ppm.

Other objects and advantages will be more fully apparent from the following disclosure and appended claims.

DETAILED DESCRIPTION OF INVENTION

It should be noted that the following detailed description is directed to a thermal reactor for producing heat energy by destroying waste and is not limited to any particular size or configuration but in fact a multitude of sizes and configurations within the general scope of the following description.

Figure 1:
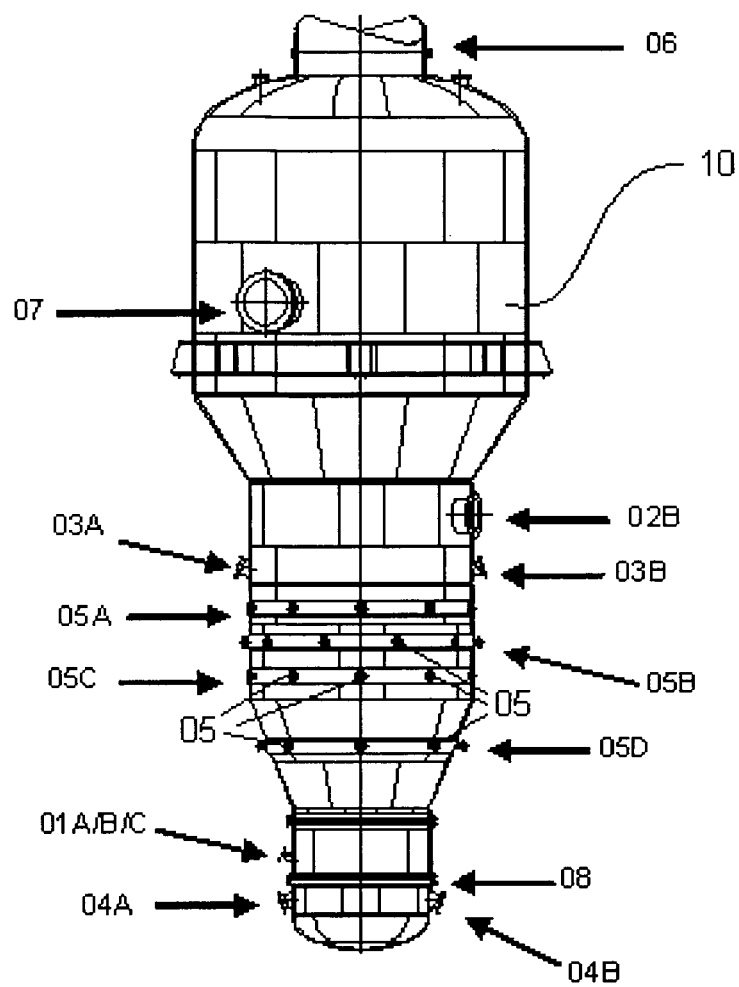
FIG. 1 shows a thermal reactor according to an embodiment of this invention.
Figure 2:
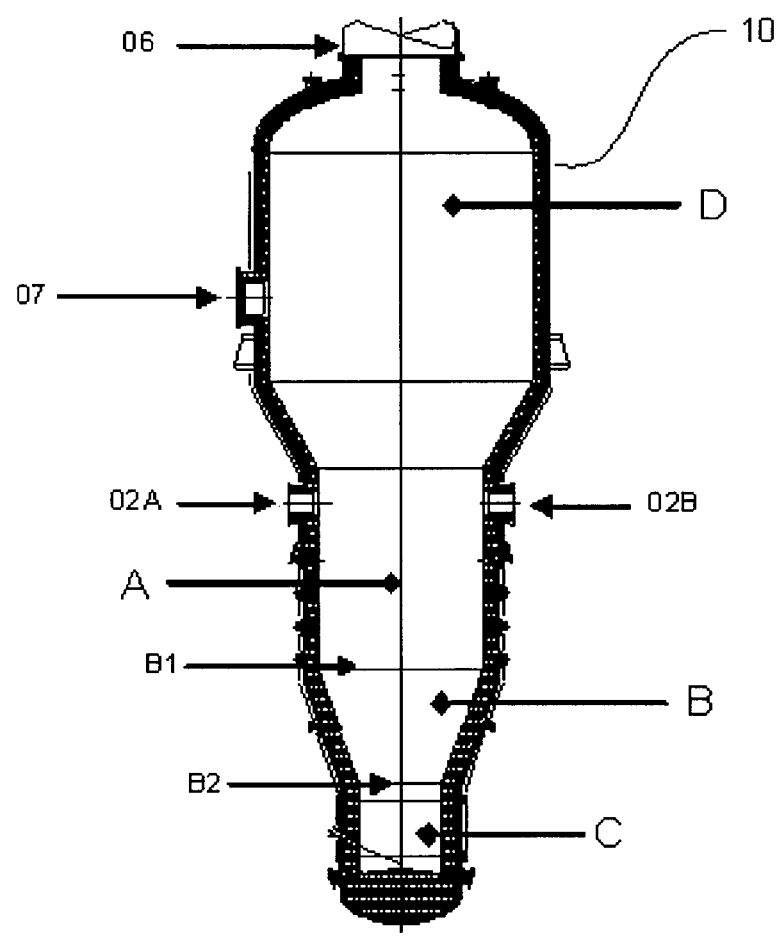
FIG. 2 shows a cross-sectional view of a thermal reactor according to an embodiment of this invention.

Referring to FIG. 1 and FIG. 2, there is shown a thermal reactor which converts organic and/or inorganic waste to useful products in the form of synthesis gas and inert glass-like mineral aggregate, respectively, both of which are re-cycled as useable products. The reactor includes an elongated vessel (10) having an internal volume, said internal volume comprising an oxidizing zone (C) located at a lower portion of the internal volume, a carbon bed (B) located above the oxidizing zone (C), a gasification zone (A) located above the carbon bed (B), and a gas retention zone (D) located above the gasification zone (A). A carbon bed is located below the gasification zone (A). The temperature of the said gasification zone (A) is in excess of 2000° C.

Thermal energy is supplied into the said oxidizing zone (C) via three inlet tuyeres (01A, 01B, 01C) located equidistant at 120° around a circumference of the vessel (10) and adapted to supply heat into the oxidizing zone (C). The amount and method of supplying the thermal energy is dependant on the waste being processed. The inlet tuyeres (01A, 01B, 01C) are adapted to be compatible with the most suitable type of thermal energy generation system, thus providing flexibility and optimization for the operation of the reactor.

In a preferred embodiment, the thermal energy necessary for gasification of the organic fraction and melting of the inorganic fraction of the waste is provided from three plasma torches (01A, 01B, 01C), which due to their variable operating characteristics will allow the necessary thermal energy to be produced from between one to three of the plasma torches. Each plasma torch, when operational, is supplied with compressed air, which may or may not be heated and/or enriched with oxygen having a purity ≥93%. Each operational plasma torch will generate plasma gas that is discharged from the torches at a temperature >6000° C. into the oxidizing zone (C) of the reactor. Each plasma torch (01A, 01B, 01C) can be adjusted from its maximum down to 30% of full capacity, providing a level of flexibility in the production of thermal energy that permits the reactor to operate with a 30% turndown ratio if the quantity of waste being fed is reduced. This flexibility also permits operation of the reactor at lower temperatures thus conserving energy without the need to shutdown consequently avoiding the extensive temperature variations and associated structural contractions/expansions associated with the starting up and shutting down of a thermal process.

In other embodiments of this invention, there could be one (01A) or two (01A, 01B) inlet tuyeres. In the case of two inlet tuyeres, they would be placed opposite each other for equal distribution of heat.

Two opposing feed ports (02A, 02B) deliver organic and/or inorganic waste purged with nitrogen into the gasification zone (A). These feed ports are located on opposing sides of the reactor and include slam shut gate valves and sensory arrays to continually monitor for flame-back. In the unlikely event combustion is detected at the interface of the feed ports and the reactor, the slam-shut gate valves will be activated to ensure that combustion is contained within the reactor. The waste includes either prepared refuse derived fuel (RDF) or unprepared raw waste or a combination thereof.

Two opposing feed ports (03A, 03B) deliver carbon into the gasification zone (A) where the carbon moves downwards and creates a carbon bed (B) between the gasification zone (A) and the oxidizing zone (C).

An exit port (06) is located at an upper end of said vessel (10) for discharge of syngas from the gas retention zone (D).

Two directly opposing slag ports (04A, 04B) are located at a lower end of the vessel for discharge of molten slag from the oxidizing zone (C).

The organic fraction of the waste upon entering the gasification zone (A) is immediately subjected to a sub-stoichiometric environment at a temperature ≥2000° C., causing it to pass through the transition and vibration phases of increasing temperature and on to disassociation of molecular bonds, or gasification as it falls onto the carbon bed top (B1). In this gasification, the organic waste is transformed into a synthesis gas (syngas) and due to its lower density and intrinsic thermal energy rises up the reactor to the gas retention zone (D). The velocity of the syngas as it percolates through the reactor is <2 m/s. The temperature of the syngas is gradually reduced so that when the resultant syngas exits the reactor via the exit port (06) its temperature will be in the order of 1200° C. to 1400° C.

The reactor breaks down the organic fraction of the waste to its respective molecular levels by way of a no-burn process, and through control of the chemistry at various stages throughout the reactor, will manage the re-formation of chemical bonds to maximise the production of a useable synthesis gas (syngas) while avoiding, or minimising, the formation of unwanted compounds such as $CO_2$, Dioxin and Furan.

The inorganic fraction of the waste upon entering the gasification zone (A) also experiences a rapid increase in temperature causing it to transform from solid to the liquid state as it falls onto the carbon bed top (B1). As this happens, its viscosity is lowered permitting it to permeate through the carbon bed (B) and then to collect in the lower portion of the oxidizing zone (C) as molten slag. Once a predetermined amount (level) of molten slag is collected, one of the two opposing slag ports (04A, 04B) located at a lower portion of the oxidizing zone (C) and protruding through the vessel (10) is opened to discharge the molten slag. After exiting the reactor this molten slag solidifies to become an inert slag with a 'glass' like appearance having a leaching level in the order of 0.005 ppm.

Lime is fed in with the waste and is maintained at a flow rate proportional to the waste being fed into the gasification zone (A) of the reactor. On entering the gasification zone (A), the lime melts as it falls onto the carbon bed (B) and permeates through it falling into the base of oxidizing zone (C). Lime functions to stabilize the molten slag in a liquid form and prevent it from solidifying prior to it being tapped from the vessel (10).

The transformation of the waste (organic and inorganic) takes place in a controlled environment inside the reactor which is at a sub-stoichiometric condition and at a pressure below 1 atmosphere. The reactor does not dispose of waste, but destroys it, whether it is organic or inorganic and irrespective of its component parts, excluding high grade radioactive waste. In destroying the waste the reactor produces considerable amounts of thermal energy which can be converted to electricity or used in other application such as district heat systems, or as the thermal energy for industrial absorption refrigeration systems often associated with air condition systems.

The carbon bed (B) is maintained in balance by the replenishment of carbon from the coke feed ports (03A, 03B) as gasification of the carbon bed (B) occurs by thermal energy from the oxidizing zone (C). In a preferred embodiment, this carbon is in the form of metallurgic coke. A sacrificial grid (B2) located between the carbon bed (B) and oxidizing zone (C) initially provides support for the carbon bed (B) before melting and combining with the molten inorganic waste. The carbon bed (B) has a pre-determined depth and lower diameter and supports itself by sintering once the sacrificial grid has melted. The initial process for affecting the sintering is by supporting the carbon on a sacrificial grid (B2) where as thermal energy is put into the reactor the carbon bed (B) slowly gasifies and in doing so sinters. The sacrificial grid (B2) melts and combines with the inorganic slag from the waste and is discharged from the reactor as part of the molten slag which solidifies to become the inert aggregate.

Maintenance of the carbon bed (B) is fundamental to the stable operation of the reactor. The carbon bed (B) serves to sustain the sub-stoichiometric environment within the reactor. The thermal energy put into the reactor at the oxidizing zone (C) contains free oxygen, which percolates through the carbon bed and as the carbon gasifies it bonds with the free oxygen and is converted to Carbon Monoxide. This allows the condition within the reactor to remain sub-stoichiometric. The carbon bed (B) also serves to enhance the distribution of thermal energy into the gasification zone (A) by virtue of its extended surface area. Thermal energy that is more evenly distributed as it comes into contact with the waste improves the gasification efficiency.

Since the carbon bed (B) is continually gasifying, make-up carbon is constantly fed via two opposing coke feed ports (03A, 03B) with the waste at a controlled rate measured to maintain a set point level of carbon relative to the volume of waste being fed into the reactor. In a preferred embodiment, the make-up carbon is metallurgical coke. The carbon bed (B) gasifies at a slower rate than the organic fraction of the waste. Consequently, the rate at which the metallurgic coke is fed to the reactor is a function of the reactor's operating temperature which is continually monitored. The metallurgic coke feed rate is automatically adjusted against this in real time. The gasification of the carbon bed (B) entails the bonding of carbon with free oxygen to form carbon monoxide. This carbon monoxide mixes with the synthesis gas and rises to collect in the gas retention zone.

The reactor includes a Carbon Monoxide enhancement capability affected through strategic positioning of steam and/or oxygen and/or oxygen enriched air and/or air injection nozzles (05). A plurality of injection nozzles (05) is provided at predetermined levels (05A, 05B, 05C, 05D) relative to the carbon bed (B) for delivering any of steam, oxygen, oxygen enriched air and/or air into said vessel (10) in order to control the gasification of the carbon bed such that carbon monoxide production is maximized. The injection nozzles (05) are positioned at a predetermined position and fed by individual header ringmain. Through the predetermined injection rates of steam and/or oxygen and/or oxygen enriched air and/or air the reactor achieves control of the chemistry of the gasification process ensuring Carbon Monoxide levels are maximised while at the same time minimising the production of Carbon Dioxide.

The profile of the reactor is configured to ensure strategic operating conditions in that by controlling the chemistry and velocity of the gas being produced through the gasification process, the recovery of energy from the waste is maximised. Because the profile of the reactor affects the velocity of the syngas, carry over into the exit gas stream of inorganic particulate matter is minimised to mainly dispersoids and particulates having dimension in the order of about $0.001\mu$ to $75\mu$.

The reactor is refractory lined throughout its entire internal surface area for protection of materials of construction, to maximise thermal energy containment in the lower section of the invention and to reduce radiant heat emitting from the outside of the invention in the upper section of the invention and becoming a hazard to personnel. A manway (07) is provided for maintenance access to the upper sections of the reactor and for similar purposes access to the lower section is achieved by a break flange (08) which permits the lowering of the bottom dished head.

The invention incorporates all necessary temperature, pressure, level and flow instrumentation and control for operating the reactor and to provide protection against upset operational conditions. Safety features are also designed into the reactor for prevention and/or reaction to over and under pressure conditions.

It should be understood that various changes, adaptations and modifications may be made thereto without departing from the gist of the invention and the scope of the claim. It should be understood, therefore, that the invention is not limited to details as illustrated and shown in the figures and that it may include variations as will be apparent to one skilled in the art.

The invention claimed is:

1. An apparatus for producing heat energy from waste comprising:
    a vessel having an internal volume, said internal volume comprising an oxidizing zone located at a lower portion of said internal volume, a carbon bed located above said oxidizing zone, a gasification zone located above said carbon bed, and a gas retention zone located above said gasification zone;
    a heat supply means located at the lower portion of said vessel, said heat supply means adapted to supply heat into said oxidizing zone;
    a plurality of injection nozzles for delivering steam, oxygen, oxygen enriched air and/or air into said vessel at predetermined levels relative to said carbon bed to control the said gasification of the carbon bed such that carbon monoxide production is maximized and to create a sub-stoichiometric environment that prevents combustion of the waste in the gasification zone;
    at least one feed port for delivering waste into said gasification zone, said waste including organic and inorganic waste;
    at least one coke feed port for delivering carbon into said gasification zone, wherein the coke feed port is positioned between the at least one feed port and the plurality of injection nozzles and penetrates the vessel, whereby said carbon upon entering said gasification zone moves downwards and creates the carbon bed below said gasification zone;
    at least one exit port for discharge of gas from said gas retention zone, said at least one exit port located at an upper end of said vessel; and
    at least one slag port for discharge of any molten slag that has collected at the lower portion of said vessel from said apparatus, said at least one slag port located at the lower portion of said vessel, wherein in operation of the apparatus:

organic waste enters the gasification zone, is gasified as a synthesis gas in the sub-stoichiometric environment and falls onto said carbon bed;

the synthesis gas is present in the gas retention zone; and molten inorganic waste is permeated through the carbon bed, moves to said oxidizing zone, and the oxidizing zone has a molten inorganic waste that exits through said at least one slag port.

2. An apparatus for producing heat energy from waste according to claim 1 wherein the said carbon bed includes during operation carbon from the said at least one coke feed port, and a gas over said carbon bed, and the carbon bed having thermal energy obtained from the oxidizing zone.

3. An apparatus for producing heat energy from waste according to claim 1 wherein the carbon bed includes carbon bonded with oxygen, and formation of the carbon bed results in carbon monoxide that is collected in the said gas retention zone.

4. An apparatus for producing heat energy from waste according to claim 1 wherein the said heat supply means comprises three inlet tuyeres placed equidistant around a circumference of and protruding through said vessel.

5. An apparatus for producing heat energy from waste according to claim 1 wherein the said at least one feed port comprises two opposing feed ports protruding through a circumference of said vessel.

6. An apparatus for producing heat energy from waste according to claim 1 wherein the said at least one coke feed port comprises two opposing coke feed ports protruding through a circumference of said vessel.

7. An apparatus for producing heat energy from waste according to claim 1 further comprising a sacrificial grid located between the said carbon bed and said oxidizing zone, said sacrificial grid initially providing support for the said carbon bed before melting and combining with the said molten inorganic waste.

8. An apparatus for producing heat energy from waste according to claim 1 wherein the said at least one slag port comprises two opposing slag ports.

9. An apparatus for producing heat energy from waste according to claim 8 wherein at least one of the said slag ports is open and includes molten inorganic waste therein, when the molten inorganic waste is at a predetermined level in the oxidizing zone.

10. An apparatus for producing heat energy from waste according to claim 1, wherein said waste includes either prepared refuse derived fuel (RDF) or unprepared raw waste or a combination thereof.

11. An apparatus for producing heat energy from waste according to claim 1 wherein the temperature of the said gasification zone is in excess of 2000° C.

12. An apparatus for producing heat energy from waste according to claim 1 wherein the temperature of the gas discharging via the said exit port is between 1200-1400° C.

13. An apparatus for producing heat energy from waste according to claim 1 wherein the velocity of the gas discharging via the said exit port is below 2 m/s.

14. An apparatus for producing heat energy from waste according to claim 1 wherein vessel is devoid of any combustion.

15. An apparatus for producing heat energy from waste according to claim 1 further comprising a manway providing maintenance access to an upper section of said vessel.

16. An apparatus for producing heat energy from waste according to claim 1 further comprising a break flange providing maintenance access to a lower section of said vessel.

17. An apparatus for producing heat energy from waste according claim 1 wherein an inside surface of the said vessel is refractory lined, said refractory lining being a poor conductor of heat.

18. An apparatus for producing heat energy from waste according claim 1 further comprising a slam shut valve that is included on the feed port, wherein the slam shut valve is configured to slam shut in response to detection of combustion at an interface of the feed port and the vessel.

* * * * *

UNITED STATES PATENT AND TRADEMARK OFFICE
CERTIFICATE OF CORRECTION

PATENT NO. : 9,568,189 B2  Page 1 of 1
APPLICATION NO. : 13/384573
DATED : February 14, 2017
INVENTOR(S) : Mazlan Ali It is certified that error appears in the above-identified patent and that said Letters Patent is hereby corrected as shown below:

On the Title Page

Column 1, Item (73), delete, "Kuala Lumpur (MY)" and insert --Seri Kembangan (MY)-- therefor.

Signed and Sealed this
Second Day of January, 2018

Joseph Matal
*Performing the Functions and Duties of the*
*Under Secretary of Commerce for Intellectual Property and*
*Director of the United States Patent and Trademark Office*